United States Patent [19]
Lipkin et al.

[11] Patent Number: 5,998,540
[45] Date of Patent: Dec. 7, 1999

[54] POLYURETHANE DISPERSIONS USEFUL FOR PREPARING THIN WALL ARTICLES

[75] Inventors: Anatoly Lipkin, Congers; Ibrahim Bechara, Carmel, both of N.Y.

[73] Assignee: Witco Corporation, Greenwich, Conn.

[21] Appl. No.: 09/177,001

[22] Filed: Oct. 22, 1998

[51] Int. Cl.$^6$ .............................. C08J 3/00; C08K 3/20; C08L 75/00; A41D 19/00; A61F 5/44
[52] U.S. Cl. .............................. 524/591; 2/159; 2/161.7; 2/167; 2/168; 264/239; 264/299; 264/301; 264/305; 446/220; 524/539; 524/839; 524/840; 604/264; 604/349
[58] Field of Search ...................................... 524/539, 591, 524/839, 840; 264/239, 299, 301, 305; 604/349, 264; 446/220; 2/159, 161, 167, 168

[56] References Cited

U.S. PATENT DOCUMENTS 5,800,872   9/1998   Katz et al. .............................. 524/591

*Primary Examiner*—Patrick D. Niland
*Attorney, Agent, or Firm*—Edward K. Welch, II; Andrew S. Reiskind; Timothy X. Witkowski

[57] ABSTRACT

Disclosed are aqueous polyurethane dispersions prepared from polyester polyols having 0.95 to 1.5 equivalents of carboxylic functionality thereon per equivalent of polyol, the dispersions also containing a nonionic surfactant component wherein the ratio by weight of said carboxylic functionality to said nonionic surfactant component is 1:2.5 to 1:0.5. The dispersions are particularly adapted to the formation of thin wall articles exhibiting greatly improved properties.

20 Claims, No Drawings

POLYURETHANE DISPERSIONS USEFUL FOR PREPARING THIN WALL ARTICLES

FIELD OF THE INVENTION

The present invention relates to aqueous dispersions of polyurethane, to the preparation of such dispersions, to the preparation of articles of manufacture from such dispersions, and to the articles so prepared.

BACKGROUND OF THE INVENTION

It is known that thin wall articles such as gloves, condoms, sleeves, catheters, balloons, teats, enema tips and other tubular articles can be made from latexes by, for instance, multiple dipping of forms or by use of a coagulant on a form. These methods are widely used for natural latex and for some of the synthetic latexes like nitrile, SBR and others. Increasing human allergy to articles made from natural latex is becoming the main concern of their applicability, but all currently available synthetic dispersions and films based on them cannot match the natural latex. The main deficiencies are the difficulty of obtaining films by ionic deposition (coagulation process), cracking of the films, substantial shrinkage upon formation of the films, poor physical properties of films, and high film toxicity to human skin due to the additives used in the processing step of the synthesis of the polymer.

It is also known that polyurethane elastomers designed for flexible gloves have some very good properties such as tensile strength, puncture resistance, non-toxicity, oil and fat resistance, and breathability. These properties are considerably better than the properties of films obtained from natural latex. The main deficiency of these elastomers is that they are solvent based, with all the accompanying consequences of hazardous manufacturing, environmental pollution and the requirement for high capital investment.

Attempts are continuously made to develop gloves from polyurethanes dispersed in water (PUD). Up to now, films made from these dispersions suffer from low tear resistance, poor elongation of the films and high modulus. In addition, it has heretofore been difficult to make articles by ionic deposition from these dispersions. When these polymers are tailored to be used by ionic deposition, then the formed articles exhibit cracking and severe shrinkage. Plasticization of films to overcome these negative properties results however in sharp lowering of physical properties.

Thus, there remains a need for aqueous dispersions of polyurethane from which gloves and other thin wall articles can be prepared, wherein the articles can be prepared reliably and easily and, once prepared, exhibit physical properties such as higher tear resistance, better elongation and better modulus, and better resistance to cracking and shrinking.

BRIEF SUMMARY OF THE INVENTION

The present invention fulfills these needs and provides other advantages as described herein.

One aspect of the present invention is an aqueous polyurethane dispersion, comprising (A) polyurethane which is the product of reacting an isocyanate terminated polyurethane prepolymer and an amine functional chain extender, wherein the prepolymer is the product of reacting a polyester polyol component, one or more diol carboxylic acids containing 4 to 12 carbon atoms, and a diisocyanate component, wherein the polyester polyol component comprises the product of reacting one or more carboxylic diacids containing 4 to 6 carbon atoms and one or more diols containing 4 to 6 carbon atoms, wherein the polyester polyol and the diol carboxylic acid are reacted in relative amounts thereof such that the reaction product contains 0.95 to 1.5 equivalents of carboxylic functionality per equivalent of said polyol, and wherein said carboxylic functionality is neutralized with an alkali hydroxide or a tertiary amine prior to or simultaneously with the reaction of said prepolymer with said amine functional chain extender, and wherein said amine functional chain extender comprises poly(oxypropylene)diamine having a molecular weight of 200 to 1,000 and (B) a nonionic surfactant component, wherein the ratio by weight of said carboxylic functionality to said nonionic surfactant component is 1:2.5 to 1:0.5.

Another aspect of the present invention is the process of forming an aqueous polyurethane dispersion, comprising the steps of (a) reacting an isocyanate terminated polyurethane prepolymer and an amine functional chain extender, wherein the prepolymer is the product of reacting a polyester polyol component, one or more diol carboxylic acids containing 4 to 12 carbons atoms, and a diisocyanate component, wherein the polyester polyol component comprises the product of reacting one or more carboxylic diacids containing 4 to 6 carbon atoms and one or more diols containing 4 to 6 carbons atoms, wherein the polyester polyol and the diol carboxylic acid are reacted in relative amounts thereof such that the reaction product contains 0.95 to 1.5 equivalents of carboxylic functionality per equivalent of said polyol, and said carboxylic functionality is neutralized with an alkali hydroxide or tertiary amine prior to or simultaneously with the reaction of said prepolymer with said amine functional chain extender, wherein said amine functional chain extender comprises poly(oxypropylene)diamine having a molecular weight of 200 to 1,000, wherein said dispersion also contains a nonionic surfactant component wherein the ratio by weight of said carboxylic functionality to said nonionic surfactant component is 1:2.5 to 1:0.5.

Another aspect of the present invention is the process of forming a thin-walled article, comprising applying a dispersion as aforesaid to a form having the shape of the desired article, optionally repeating the application of said dispersion thereto, and allowing the dispersion to dry. Yet another aspect of the present invention is articles produced thereby.

DETAILED DESCRIPTION OF THE INVENTION

It has been discovered that preparation of a polyurethane dispersion as described herein provides an aqueous dispersion with optimal colloidal properties thereby making it possible to obtain films with outstanding physical properties by a variety of techniques such as ionic deposition or multiple dipping processes.

The aqueous polyurethane dispersions of the present invention are useful in many applications. In particular, films produced from these dispersions can be used in manufacturing hypoallergenic surgical gloves, which can be easily put on and taken off, which are comfortable to wear, and which do not exhibit the irritancy that is too often characteristic of natural latex gloves. Other thin walled, flexible articles can also be produced from the dispersions of the present invention, such as prophylactics, catheters, balloons, drainage tubes, and the like. Typical wall thickness is 2 to 7 mils, although as will be recognized this is not limiting of the advantageous properties of the present invention.

The polyurethane dispersions of the present invention include water, polyurethane, and a nonionic surfactant component.

The polyurethane is prepared from a hydroxyl-terminated polyester polyol component exhibiting certain characteristics, by reacting it with diol carboxylic acid and a diisocyanate component to produce an isocyanate terminated polyurethane prepolymer, and then reacting the isocyanate terminated polyurethane prepolymer with a particular amine functional chain extender.

The polyester polyol component is preferably obtained by reacting under esterification conditions one or more carboxylic diacids containing 4 to 6 carbon atoms and one or more diols containing 4 to 6 carbon atoms. The carboxylic diacid or diacids and the diol or diols can each be straight chain or branched, or can comprise mixtures of straight chain and branched compounds. Preferably, the diacids and diols are not branched.

Preferred diols include 1,4-butanediol, 1,6-hexanediol, and mixtures thereof. A preferred diacid is adipic acid.

The one or more diacids and the one or more diols are combined and reacted together under condensation polymerization conditions whereupon esterification proceeds to form the desired polyester polyol component. The diacid and diol components should be present in amounts relative to each other such that the polyester polyol is hydroxyl-terminated. Typical condensation polymerization conditions are provided by exposing the reactants to temperatures on the order of about 150° C. to about 250° C. During the progress of the reaction, it is preferred to draw off water of condensation. To effectively carry out the desired condensation polymerization, it is preferred to use nitrogen to purge the reaction mixture in order to carry off the water of condensation. The chain lengths and molecular weights of the polyester polyols that are produced in this step can fall within a rather wide range. Typically, polyester polyols most useful in preparing the polyurethanes of the present invention will have a molecular weight in the range of about 500 to 6,000. Polyester polyols meeting these characteristics are commercially available and can be used.

Next, the polyester polyol component, one or more diol carboxylic acids containing 4 to 12 carbon atoms, and one or more diisocyanates are reacted together whereby the hydroxyl terminal groups of the polyester polyol and of the diol carboxylic acid react with isocyanate groups.

Preferred diol carboxylic acids include 2,2-dimethylol propionic acid ("DMPA"), which is especially preferred, and 2,2-dimethylol acetic acid, 2,2-dimethylol butyric acid, and 2,2-dimethylol pentanoic acid.

Sufficient diol carboxylic acid should be present such that the reaction product contains 0.95 to 1.5 equivalents of carboxylic functionality (that is, the carboxylic functionality obtained from the diol carboxylic acid component) per equivalent of said polyester polyol.

During this reaction, or at some other point prior to the chain extending reaction, the carboxylic functionality of the one or more diol carboxylic acids should be neutralized, or converted to the salt form, by reaction thereof with an appropriate amount of an alkali hydroxide such as sodium hydroxide or a tertiary amine such as triethylamine, which is preferred. In this manner, the carboxylic functionality derived from the one or more diol carboxylic acids provides what is known as an internal surfactant functionality for the polyester polyol and, eventually, for the polyurethane which is subsequently formed therefrom.

Any organic polyisocyanates may be used in the process according to the invention. It is preferred to use polyisocyanates of the formula $Q(NCO)_2$ wherein Q represents an aliphatic hydrocarbon group containing from 4 to 12 carbon atoms, a cycloaliphatic hydrocarbon group containing from 6 to 15 carbon atoms, an aromatic hydrocarbon group containing from 5 to 15 carbon atoms or an aliphatic hydrocarbon group containing from 7 to 15 carbon atoms. The most preferred diisocyanate is isophorone diisocyanate. The following are examples of other preferred diisocyantes: tetramethylene-diisocyanate, hexamethylene diisocyanate, dodecamethylene-diisocyanate, 1,4-diisocyanatodicyclohexane, 1-isocyanato-3, 3,5-trimethyl-5-isocyanatomethyl cyclohexane, 4,4'-diisocyanatodicyclohexylmethane, 4,4'-diisocyanatodicyclohexyl-propane-(2,2), 1,4-diisocyanatobenzene, 2,4-diisocyanatotoluene, 2,6-diisocyanatotoluene; 4,4'-diisocyanatodiphenylmethane, 4,41'-diisocyanatodiphenylpropane-(2,2), p-xylylene-diisocyanate, a,a,a',a'-tetramethyl-m-or p-xylylene-diisocyanate, and mixtures of these compounds. Mixtures of any of the foregoing can also be used. The mole ratio of diisocyanate to polyester is generally stoichiometric, e.g. (2.0–2.1):1.

Reaction of the polyester polyol, the diol carboxylic acid and the diisocyanate can be carried out at moderately elevated temperatures, e.g. 50° C.–100° C. The reaction is generally carried out in an inert solvent or without a solvent. One preferred solvent is N-methyl pyrrolidone. Other suitable solvents include acetone, methyl ethyl ketone, toluene, dimethyl formamide, ethyl acetate, tetrahydrofuran, and dioxane.

The isocyanate terminated polyurethane prepolymer which results from this reaction is then reacted with an amine functional chain extender component. The amine functional chain extender component should be present in an amount sufficient to react with substantially all the isocyanate terminal groups, thereby crosslinking and capping the isocyanate groups on the prepolymer.

The amine functional chain extender component must comprise poly(oxypropylene)diamine having a molecular weight of 200 to 1,000. As might be expected, a mixture of poly(oxypropylene)diamines having varying molecular weights can be used. One can optionally include, in addition to the poly(oxypropylene)diamine, one or more additional water soluble polyamines such as diethylene triamine, ethylene diamine, diethylene diamine, or hexamethylene diamine. When such amine functional compounds in addition to the poly(oxypropylene)diamine are present, the poly(oxypropylene)diamine should constitute at least about 90 wt. % of the total amount of amine functional chain extender present.

One can optionally include with the polyester polyol one or more polyether polyols having a molecular weight of 200 to 2,000. Examples of such polyether polyols include polyethylene glycol, polypropylene glycol, and polytetramethylene glycol, and mixtures thereof.

The product of this reaction sequence is a chain extended polyurethane.

The aqueous dispersions according to the present invention contain this polyurethane and also contain a nonionic surfactant component. The nonionic surfactant component can comprise one or more of any nonionic surfactants. The ratio by weight of the carboxylic functionality present on the polyester polyol (derived from the one or more diol carboxylic acid reactants) to the total amount of nonionic surfactant component should be 1:2.5 to 1:0.5 in order to obtain optimal performance of the polyurethane dispersion.

Too high an amount of nonionic surfactant impedes the coagulation and dipping steps whereby a thin walled article is prepared from the aqueous polyurethane dispersion. Too low an amount of nonionic surfactant leaves a dispersion too unstable for effective usage.

Nonionic surfactants include any nonionic compounds having surface active capability. Examples include esters, amides, and alkanolamides, containing a total of 6 to 40 carbon atoms, optionally zero to 3 carbon—carbon double bonds and optionally substituted with 1 to 20 hydroxyl groups (as e.g. polyglycol esters);

homopolymers, random copolymers and block copolymers of ethylene glycol and/or propylene oxide and/or ethylene glycol and/or propylene glycol, containing 2 to 200 repeating units;

any of the foregoing homopolymers, random copolymers and/or block copolymers, but especially poly(ethylene oxide), substituted with alkyl or alkylene containing 1 to 40 carbon atoms and optionally up to 6 carbon-carbon double bonds, and optionally 1 to 20 hydroxyl groups, or substituted with an ester, amide, amine, alkanolamide or with an aryl group (especially phenyl) or an aryl—aryl group, itself optionally substituted with alkyl or alkylene containing up to 40 carbon atoms and optionally containing 6 carbon—carbon double bonds; and sorbitol derivatives, including those known generically as polysorbate -20, -32, -40, -60, -61, -65, -8-, -81, and -85.

The particular selection of the type of nonionic surfactants, and the particular compound selected, for any given application can readily be made by those of ordinary skill in this art with reference to the intended application and to the surface properties needed, with due consideration to the amount thereof and the properties desired of the final product. In particular, the HLB (hydrophilic/lipophilic balance) which needs to be exhibited by the surfactant chosen can likewise be determined quite readily for any particular end-use application.

The nonionic surfactant is preferably added during the stage in which the polyester polyol is reacted with the diisocyanate component, or thereafter.

The resulting aqueous dispersion of polyurethane should preferably comprise 30 to 50 wt. % polyurethane. These dispersions have been found to be especially useful in formation of thin wall articles by any of several techniques, which are now described.

The articles may be formed on commercially available porcelain, metallic or high density polyethylene forms. In a multiple dipping process, because of the high adhesion of the polyurethane, porcelain and metallic forms must be preliminarily surface treated to obtain adequate release properties for the film that is created on the form. One treatment that can be used is to coat the forms with a release agent such as sprayable poly(tetrafluoroethylene) or silicone emulsion. Other techniques conventionally used for mold release are also effective.

In multiple dipping processes it is difficult to obtain an article (glove, condom, etc.) that is pore free by a single dip. Several dips are required to build up non-porous, non-defective film.

In ionic deposition processes, a standard coagulant solution (for example, a thickened 30% water solution of $Ca(NO_3)_2$) may be used. Dipping of the form into the solution for about 20 seconds is enough to obtain a film of polyurethane which is 3–7 mil in thickness. The time of exposure of the form to the coagulant solution depends on the solid content of the polyurethane dispersion.

A good chemical resistance to some disinfecting solutions like ethyl alcohol or isopropyl alcohol can be achieved by the addition of a water compatible curing agent to the polyurethane dispersion. One example of such curing agents is the epoxy emulsion "Witcobond W-XW" (supplied by Witco Corp.). The recommended dose of such crosslinker is 3–10 parts by weight per 100 parts by weight of the polyurethane dispersion. Other curing systems commercially available for this purpose can also be used to obtain the same properties of the finished articles.

As with any latex system, the polyurethane dispersions of the present invention should be formulated to avoid such defects as micro bubbles, thinning and the like in dipped films. For these purposes, the surfactant "Surfynol SE-F" (0.5 parts by weight per 100 parts by weight of PUD) and the defoamer "Surfynol DF-37" (0.25 parts by weight per 100 parts by weight of PUD) (Air Products is a supplier of these materials) were used.

In multiple dipping processes the thin wall articles are prepared by simple multiple (2–4 times) dipping of appropriate forms (coated with release agent or made from polyethylene) in the thus formulated polyurethane dispersion, and rotating the form in the dispersion uniformly in all directions. The rotation is necessary, because in this process the film does not become affixed to the form before the film is dried on the form. It takes 10–20 min. at 60° C. for each layer to complete drying. After drying of the last layer the coated form is baked, for instance at 120° C. for 20 min. to obtain a cured article with proper physical properties.

In ionic deposition processes, the thin wall articles (films) can be prepared by the following method:

Clean forms were dipped in standard coagulant (30% water solution of $Ca(NO_3)_2$ thickened with calcium carbonate) and then dried for 5 min. at 60° C. Then the forms coated with coagulant were dipped in the polyurethane dispersion for 20 seconds and then subjected to air drying for 2 min. at 60° C. and then to water leaching for 5 min. at 40° C. Then the article is subjected to a final drying stage for 15 min. at 60° C. and then to a final curing stage at 120° C. for 20 min. There was no problem in stripping the films off the form. The films obtained in this way exhibited thicknesses of from 2.5 to 7 mil, depending on the solids content of the polyurethane dispersion.

The invention is illustrated in more detail in the following non-limiting examples. Unless otherwise indicated, all parts are by weight.

EXAMPLE 1

A prepolymer was prepared by mixing 245 g of FOMREZ 146-40 (Witco), a 2,800 MW polyesterpolyol having a hydroxyl number of 40 and an acid number less then 0.5 (made by reaction of 1,4-butanediol, 1,6-hexanediol, and adipic acid) and 11.4 g of dimethylol propionic acid (DMPA)) in a suitable reactor. This mixture was heated to 50° C. To this was added 68.5 g of isophorone diisocyanate, and the three components reacted to form an isocyanate-capped prepolymer.

A polyurethane dispersion was prepared by dispersing 325 g of this prepolymer at room temperature in an aqueous solution containing 11.4 g of the external surfactant "Igepal CO-730", 0.5 g of the antifoam agent "SWS-211", and 8.6 g of triethylamine in 565 g of water. The dispersed prepolymer was chain extended by reacting it in this dispersion with 39.9 g of poly(oxypropylene)diamine with molecular weight 400 and 0.2 g of diethylenetriamine.

Films were obtained by casting the polyurethane dispersion onto a glass surface and by ionic deposition.

To demonstrate that the ratio between the carboxylic functionality of the polyester polyol and the external surfactants should be maintained within the range set forth herein so as to obtain proper physical and deposition properties, twelve polyurethane dispersions were prepared in accordance with Table 1 below using the procedure in Example 1.

As is shown in Table 1, where the level of carboxylic functionality of the polyurethane (i.e., the internally built emulsifying agent) is from 0.95 to 1.5 equivalent per 1 equivalent of the polyester polyol, and the ratio of that carboxylic functionality to the amount of external surfactants is from 1:2.5 to 1:0.5 by weight, and polyoxypropylenediamine with a molecular weight of 236 or 600 was used as a chain extender (Examples A, 2, 3, 9 and 10), the film properties which were obtained are acceptable. When the ratio and the proportion between the carboxylic functionality and the external surfactants are outside those limits (Examples 4, 5, 7, 8, 11 and 12), the film properties obtained from the resulting dispersions were not satisfactory.

TABLE 1

Comparison of PUDS made with different chain extenders and emulsifier ratios

| Components | Control = Ex. A | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Polyol | 245 | 245 | 245 | 245 | 245 | 245 | 245 | 245 | 245 | 245 | 245 | 245 |
| DMPA | 11.4 | 11.4 | 11.4 | 11.4 | 11.4 | 19 | 10 | 20 | 11.4 | 11.4 | 11.4 | 11.4 |
| Isocyanate | 68.5 | 68.5 | 68.5 | 68.5 | 68.5 | 68.5 | 68.5 | 68.5 | 68.5 | 68.5 | 68.5 | 68.5 |
| Dispersion: | | | | | | | | | | | | |
| Water | 565 | 565 | 565 | 565 | 565 | 565 | 565 | 565 | 565 | 565 | 565 | 565 |
| Nonionic surfactant | 11.4 | 28 | 5.8 | 4.5 | 4.5 | 11.4 | 11.4 | 11.4 | 11.4 | 11.4 | 11.4 | 11.4 |
| Defoamer | 0.5 | 0.5 | 0.5 | 0.5 | 0.5 | 0.5 | 0.5 | 0.5 | 0.5. | 0.5 | 0.5 | 0.5 |
| Triethylamine | 8.6 | 8.6 | 8.6 | 8.4 | 8.6 | 14.2 | 8.6 | 15 | 8.6 | 8.6 | 8.6 | 8.6 |
| Proxypropylene Diamine: | | | | | | | | | | | | |
| Mol. Wt. = 400 | 39.9 | 39.9 | 39.9 | 39.9 | 39.9 | 39.9 | 39.9 | 39.9 | | | | |
| Mol. Wt. = 230 | | | | | | | | | 20.4 | | | |
| Mol. wt. = 600 | | | | | | | | | | 60 | | |
| Mol. wt. = 2000 | | | | | | | | | | | 191.7 | |
| 35% Hydrazine | | | | | | | | | | | | 1o.4 |
| Film Forming Properties: | | | | | | | | | | | | |
| Casting | good | good | good | good | high viscosity | good | failed | good | good | good | failed | good |
| Ionic deposition | good | good | good | failed | good | good | | good | good | good | | good |
| Shrinkage | | | | | high shrink | | high shrink | | | | | shrinkage |
| Strippability | good | good | good | | | poor | | | good | good | | poor |
| Film Properties: cast/ionic deposition | | | | | | | | | | | | |
| 100% Modulus, psi | 210/ 357 | 180/ 300 | 280/ 420 | | 400/ 700 | failed | cracked | 310/ 460 | 200/ 320 | failed | 450/ 710 |
| 300% Modulus, psi | 340/ 670 | 270/ 470 | 435/ 610 | | 720/ 1100 | | | 505/ 675 | 280/ 480 | | 1100/ 1500 |
| 500% Modulus, psi | 830/ 1600 | 710/ 1400 | 100/ 2000 | | 2500/ 3000 | | | 1300/ 220 | 520/900 | | 2600/ 3200 |
| Elongation, % | 750/ 710 | 780/ 720 | 705/ 640 | | 590/ 520 | | | 690 / 620 | 850/750 | | 630/ 590 |
| Tensile strength, psi | 4500/ 6500 | 2800/ 3400 | 500/ 7700 | | 5000/ 7800 | | | 5800/ 780 | 2000/ 3800 | | 6600/ 7700 |

What is claimed is:

1. An aqueous polyurethane dispersion, comprising
(A) polyurethane which is the product of reacting an isocyanate terminated polyurethane prepolymer and an amine functional chain extender,
wherein the prepolymer is the product of reacting a polyester polyol component, one or more diol carboxylic acids containing 4 to 12 carbon atoms, and a diisocyanate component, wherein the polyester polyol component comprises the product of reacting one or more carboxylic diacids containing 4 to 6 carbon atoms and one or more diols containing 4 to 6 carbon atoms, wherein the polyester polyol component and the diol carboxylic acid are reacted in relative amounts thereof such that the reaction product contains 0.95 to 1.5 equivalents of carboxylic functionality per equivalent of said polyol, and wherein said carboxylic functionality is neutralized with an alkali hydroxide or a tertiary amine prior to or simultaneously with the reaction of said prepolymer with said amine functional chain extender,
and wherein said amine functional chain extender comprises poly(oxypropylene)diamine having a molecular weight of 200 to 1,000;

(B) a nonionic surfactant component, wherein the ratio by weight of said carboxylic functionality to said nonionic surfactant component is 1:2.5 to 1:0.5;

and (C) water.

2. A dispersion according to claim 1 wherein said one or more diols are selected from the group consisting of 1,4-butanediol, 1,6-hexanediol, and mixtures thereof.

3. A dispersion according to claim 1 wherein said one or more diacids comprises adipic acid.

4. A dispersion according to claim 1 wherein said diisocyanate component comprises isophorone diisocyanate.

5. A dispersion according to claim 1 wherein said one or more diols are selected from the group consisting of 1,4-butanediol, 1,6-hexanediol, and mixtures thereof, and said diacid is adipic acid.

6. A process of forming an aqueous polyurethane dispersion, comprising reacting an isocyanate terminated polyurethane prepolymer and an amine functional chain extender in water, wherein the prepolymer is the product of reacting a polyester polyol component, one or more diol carboxylic acids containing 4 to 12 carbon atoms, and a diisocyanate component, wherein the polyester polyol component comprises the product of reacting one or more carboxylic diacids containing 4 to 6 carbon atoms and one or more diols containing 4 to 6 carbon atoms, and wherein the polyester polyol component and the diol carboxylic acid are reacted in relative amounts thereof such that the reaction product contains 0.95 to 1.5 equivalents of carboxylic functionality per equivalent of said polyol, and neutralizing said carboxylic functionality with an alkali hydroxide or tertiary amine prior to or simultaneously with the reaction of said prepolymer with said amine functional chain extender, wherein said amine functional chain extender comprises poly(oxypropylene)diamine having a molecular weight of 200 to 1,000, wherein said dispersion also contains a nonionic surfactant component wherein the ratio by weight of said carboxylic functionality to said nonionic surfactant component is 1:2.5 to 1:0.5.

7. A process according to claim 6 wherein said one or more diols are selected from the group consisting of 1,4-butanediol, 1,6-hexanediol, and mixtures thereof.

8. A process according to claim 6 wherein said one or more diacids comprises adipic acid.

9. A process according to claim 6 wherein said diisocyanate component comprises isophorone diisocyanate.

10. A process according to claim 6 wherein said one or more diols are selected from the group consisting of 1,4-butanediol, 1,6-hexanediol, and mixtures thereof, and said diacid is adipic acid.

11. A process of forming a thin-walled article, comprising applying a dispersion in accordance with claim 1 to a form having the shape of the desired article, optionally repeating the application of said dispersion thereto, and allowing the dispersion to dry.

12. A process according to claim 11 wherein said one or more diols are selected from the group consisting of 1,4-butanediol, 1,6-hexanediol, and mixtures thereof.

13. A process according to claim 11 wherein said one or more diacids comprises adipic acid.

14. A process according to claim 11 wherein said diisocyanate component comprises isophorone diisocyanate.

15. A process according to claim 11 wherein said one or more diols are selected from the group consisting of 1,4-butanediol, 1,6-hexanediol, and mixtures thereof, and said diacid is adipic acid.

16. An article produced by the process of claim 11.

17. An article produced by the process of claim 12.

18. An article produced by the process of claim 13.

19. An article produced by the process of claim 14.

20. An article produced by the process of claim 15.

* * * * *